A. L. STEWART AND E. FINSEN.
GEAR CUTTING MACHINE.
APPLICATION FILED OCT. 14, 1920.
1,403,526.
Patented Jan. 17, 1922.
8 SHEETS—SHEET 6.
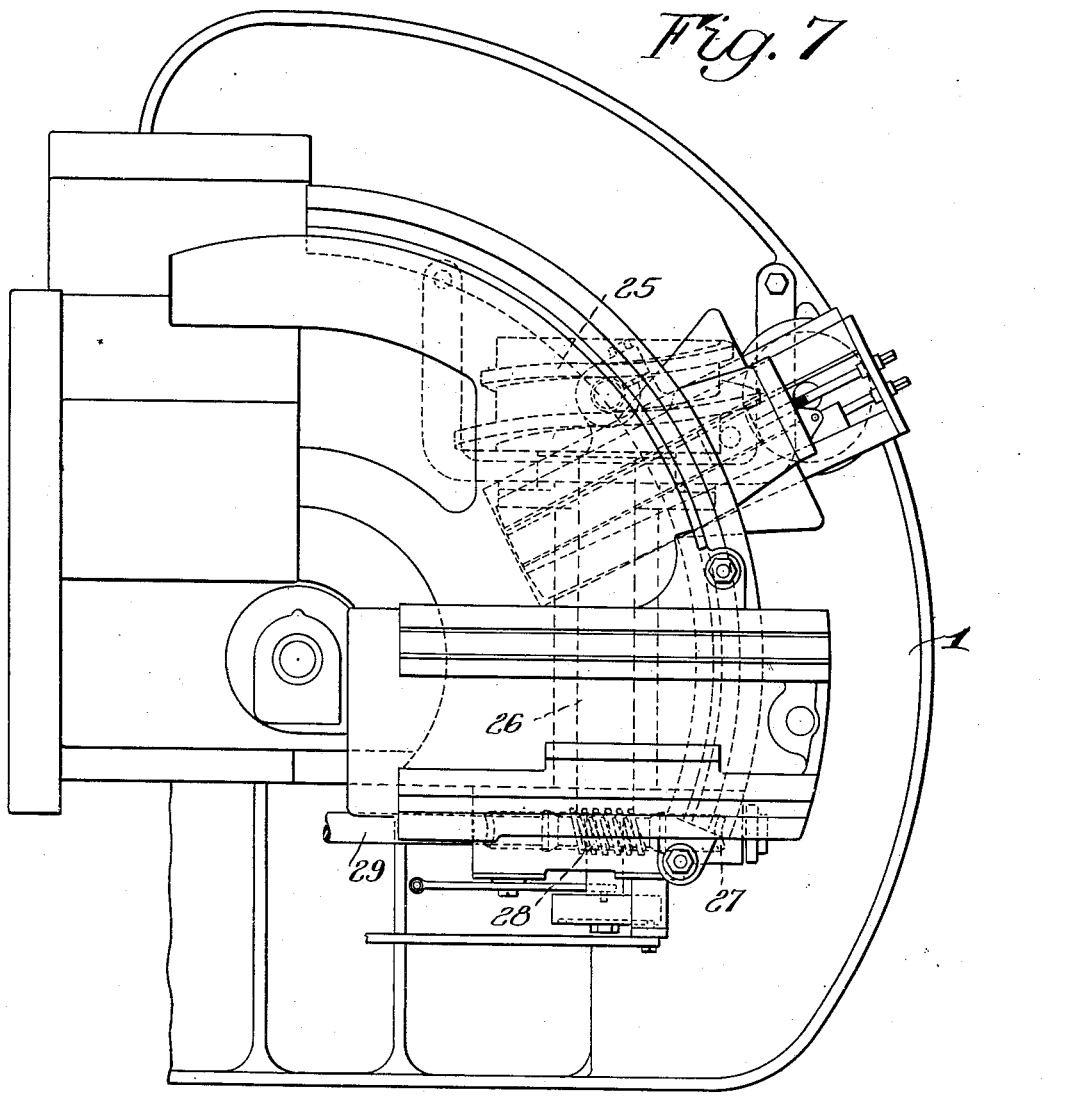
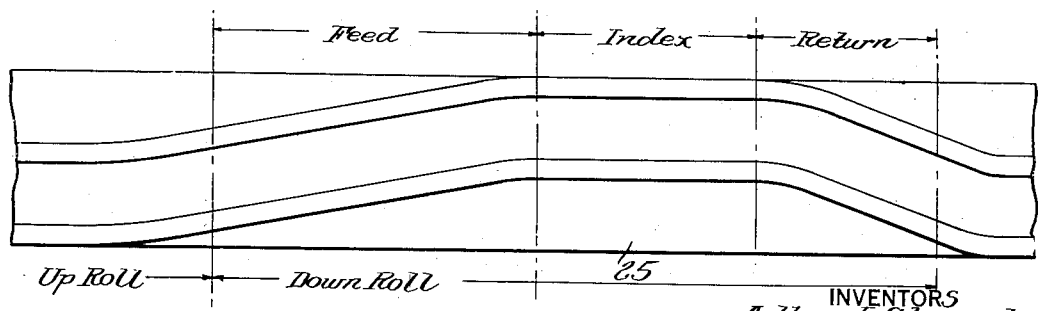

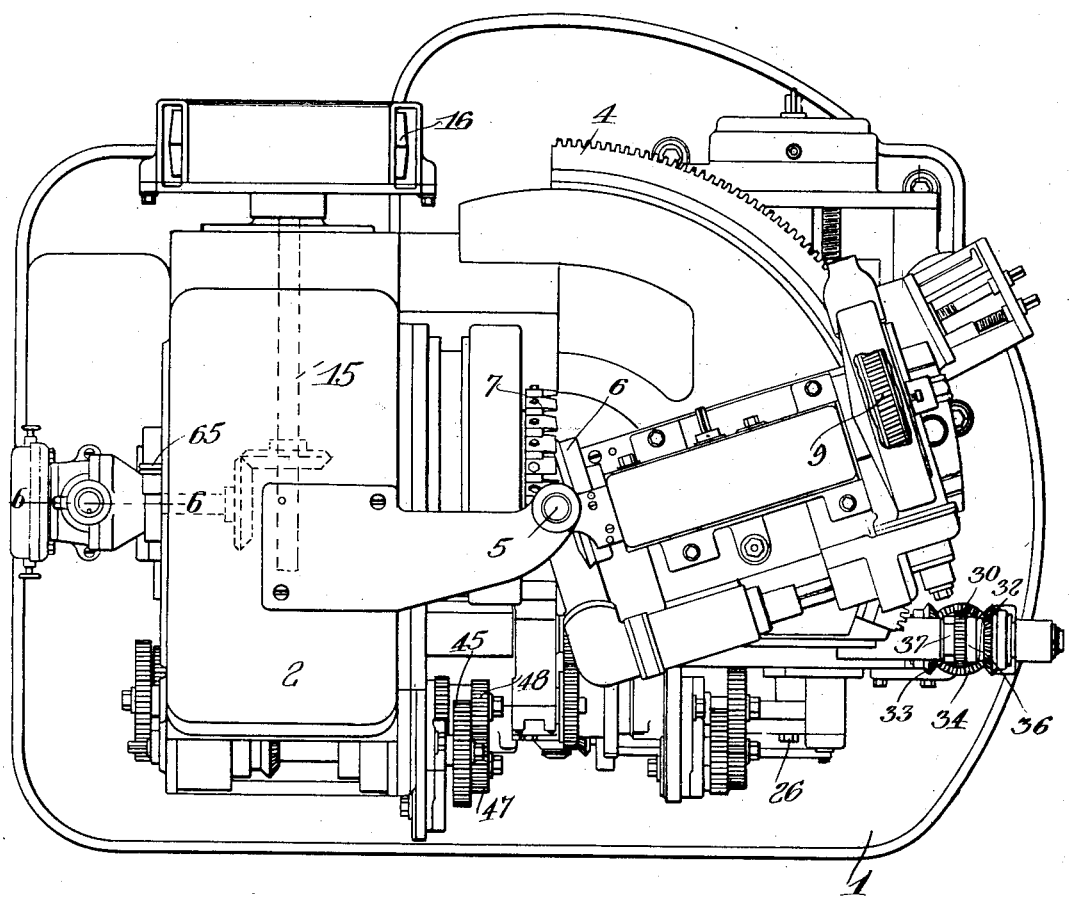

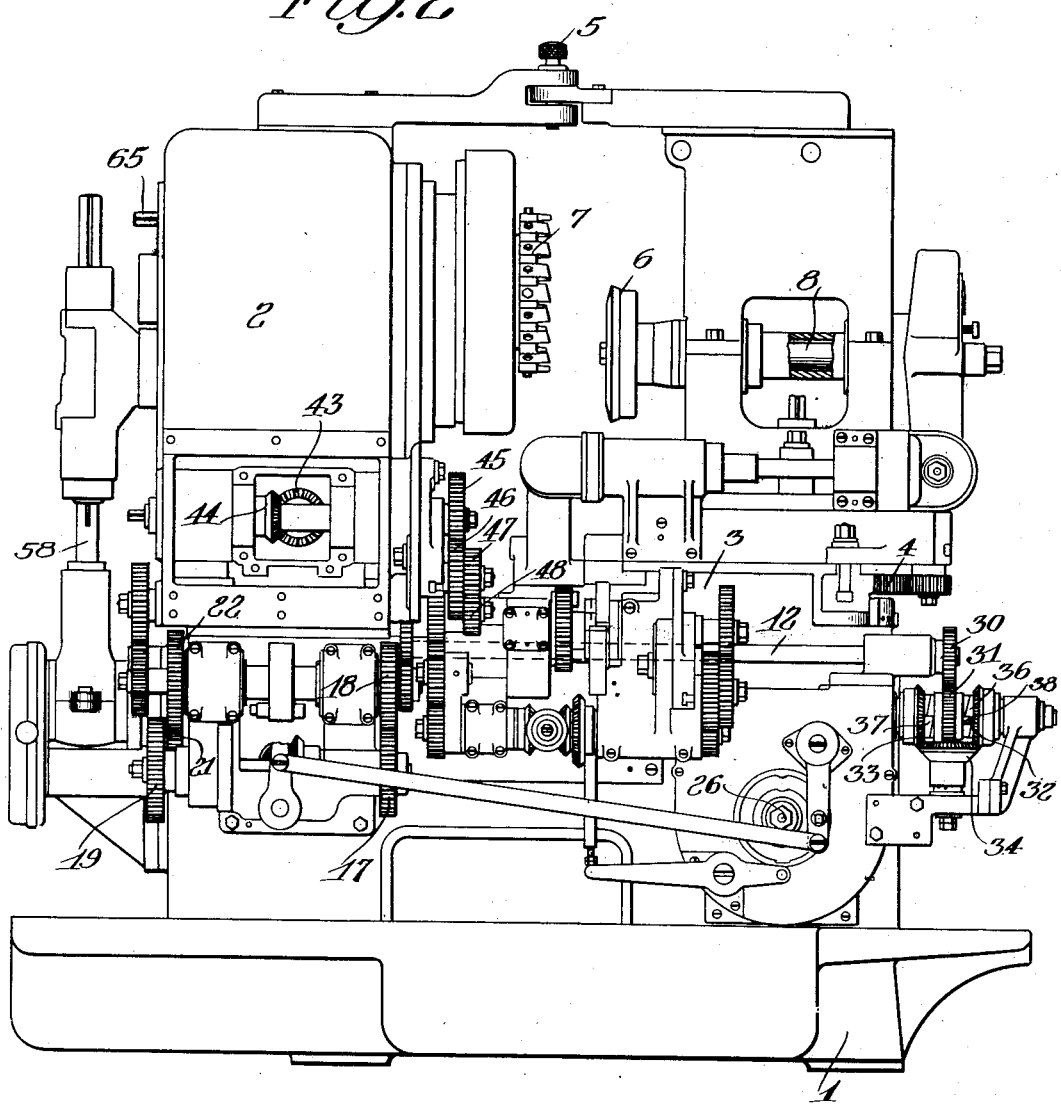

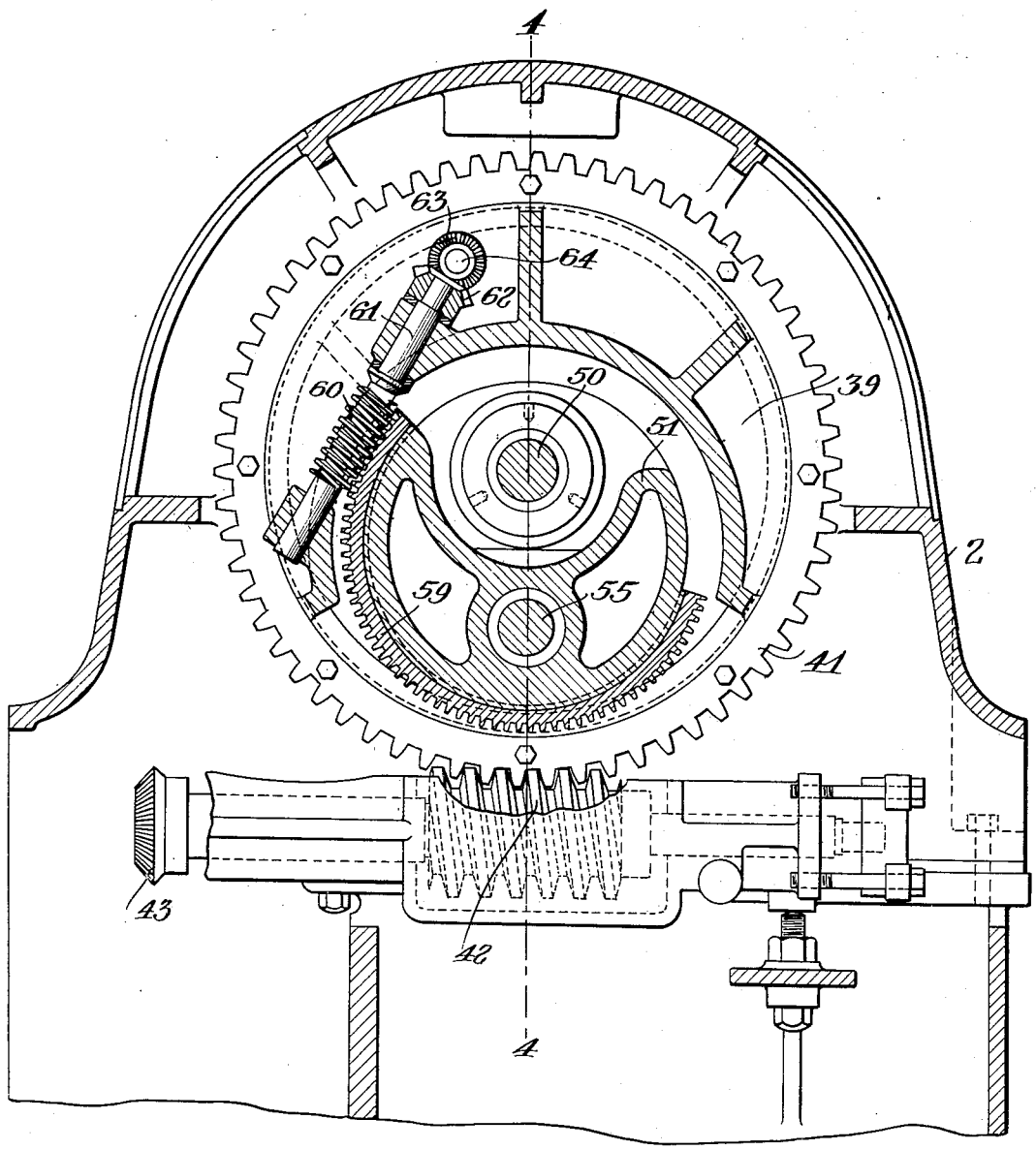

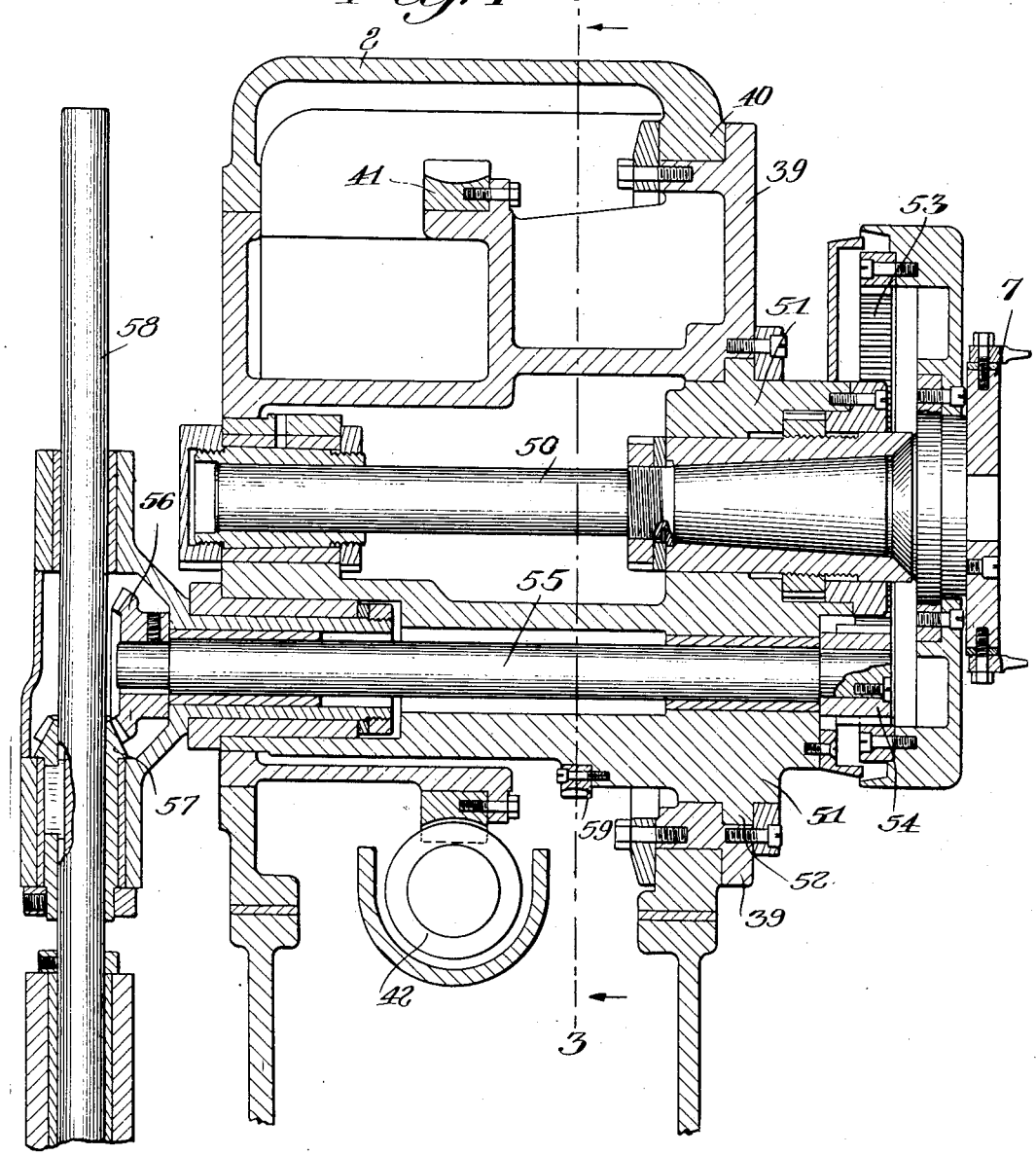

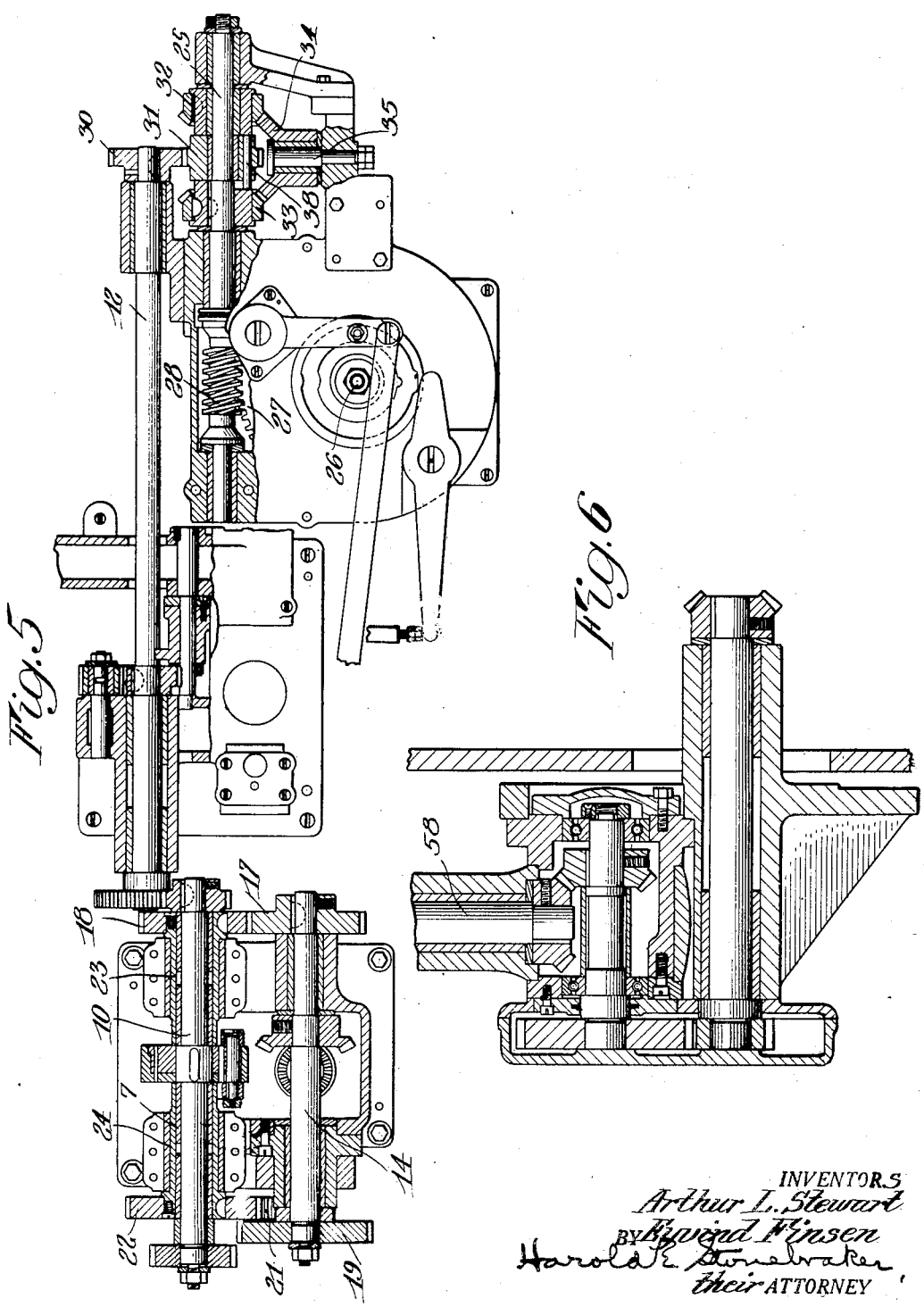

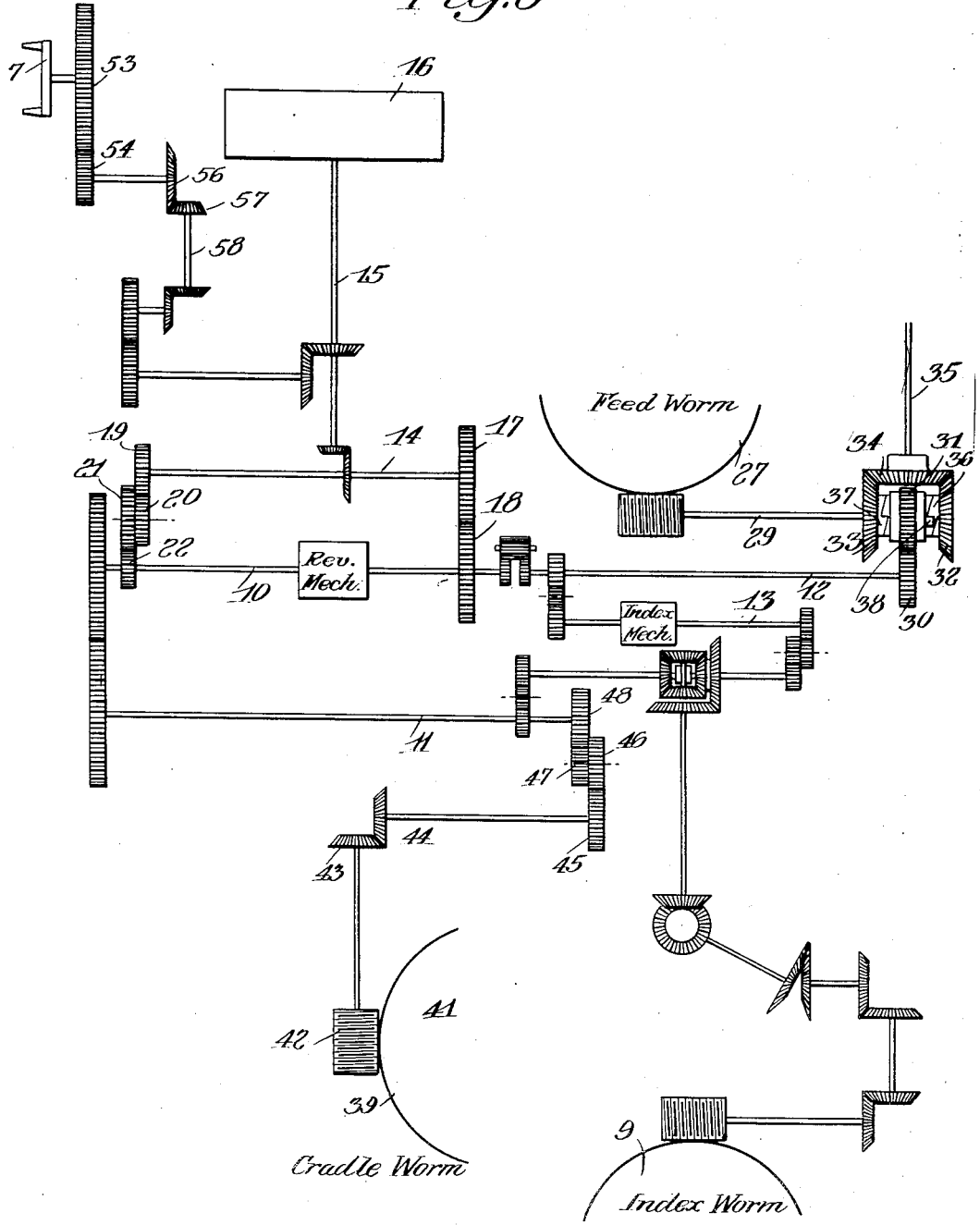

A. L. STEWART AND E. FINSEN.
GEAR CUTTING MACHINE.
APPLICATION FILED OCT. 14, 1920.

1,403,526.

Patented Jan. 17, 1922.

8 SHEETS—SHEET 8.

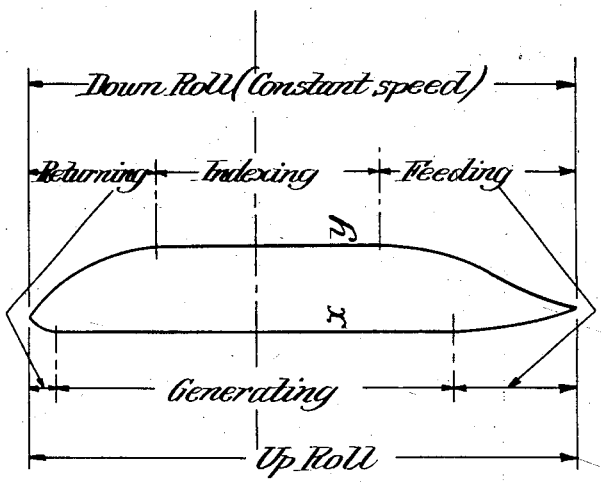

Fig. 10

New type generating cycle with one speed for cutting and different speed for rest of cycle.

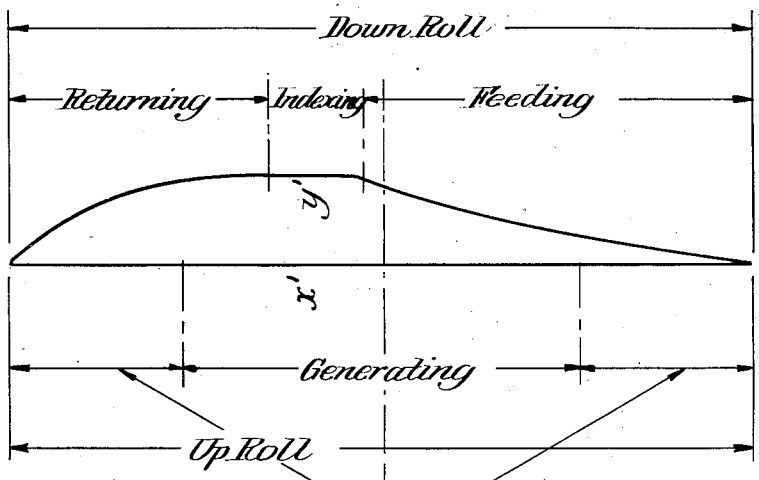

Fig. 9

Old type generating cycle with constant speed throughout.

Amounts of extra roll necessary to compensate for backlash in gear trains.

INVENTORS
Arthur L. Stewart
Eyvind Finsen
BY Harold E. Stonebraker
their ATTORNEY

UNITED STATES PATENT OFFICE.

ARTHUR L. STEWART AND EYVIND FINSEN, OF ROCHESTER, NEW YORK, ASSIGNORS TO GLEASON WORKS, OF ROCHESTER, NEW YORK, A CORPORATION OF NEW YORK.

GEAR-CUTTING MACHINE.

1,403,526.    Specification of Letters Patent.    Patented Jan. 17, 1922.

Application filed October 14, 1920. Serial No. 416,975.

*To all whom it may concern:*

Be it known that we, ARTHUR L. STEWART and EYVIND FINSEN, citizens of the United States of America, residing at Rochester, in the county of Monroe and State of New York, have invented certain new and useful Improvements in Gear-Cutting Machines, of which the following is a specification.

The invention relates to gear cutting machines for producing either straight or curved tooth gears, and in certain respects is particularly adapted to the generating type of machine, in which the cutting action takes place during a relative rolling motion of a gear blank and tool, corresponding to the relative motion that occurs by rolling a gear upon a rack, it being understood that this rolling motion may be effected either by rolling the gear blank past the tool, or by rolling the tool past the gear blank, or by putting part of the motion on both the tool and blank, as well known in this general class of machines.

One of the chief purposes of the invention is to increase the speed of the machine, by driving the parts at one speed while the tool and blank are in cutting contact and at a faster speed while they are out of cutting contact, during the indexing operation.

Another object of the improvement is to decrease the amount of rolling motion required between the gear blank and tool, and obviate the increased rolling motion that has heretofore been necessary in order to prevent the tool from cutting into the blank except when in correct generating position. In a machine of this type, the usual operation is to roll the gear blank and tool relatively in one direction, while the tooth is being cut, and to roll them relatively in the opposite direction to permit returning the blank, indexing, and again feeding it into contact with the tool. For convenience, throughout this application, the first mentioned rolling motion is referred to as a "rolling-generating" motion, and the last mentioned motion as a "rolling-indexing" motion, it being understood that these terms refer only to the relative rolling motion of the gear blank and tool, irrespective of whether the actual rolling is applied to the gear blank, or to the tool, or partly to both.

It has been the general practice to maintain the tool and blank in cutting contact throughout the rolling-generating motion, thereby necessitating rolling the gear blank beyond the tool far enough so that at the beginning and at the end of the rolling-generating motion, the back lash in the gears will not cause the tool to strike the blank and make inaccurate cuts. In order to avoid this excessively long rolling action, it is one of the purposes of this invention to partially return the gear blank, or partially withdraw it from the tool, during the last part of the rolling-generating motion, and also to complete the feeding of the gear blank into cutting contact during the first part of the rolling-generating motion. In other words, instead of having the entire returning and feeding motions of the gear blank during the rolling-indexing motion as heretofore, the return motion will be commenced during the last part of the rolling-generating motion and completed during the first part of the rolling-indexing motion, while the feeding motion will be commenced during the last part of the rolling-indexing motion and completed during the first part of the rolling-generating motion. By this method of operation, the actual roll required is considerably lessened and the speed of the apparatus correspondingly increased.

Still an additional purpose is to provide a simplified form of adjusting means for the tool support, which is especially applicable to machines where the required rolling motion is effected by oscillating the tool mechanism while rotating the gear blank about its axis. In such machines it is necessary to provide for adjustment of the tool radially of the tool carrier, or toward and from the center about which the tool mechanism oscillates, and it is one of the purposes of this invention to accomplish this by a single adjustment of the tool holder by moving the latter in a curved path eccentrically of the oscillating carrier for the tool mechanism.

The invention also includes certain other improvements, all of which will appear more clearly from the following description in conjunction with the accompanying drawings, the novel features being pointed out in the claims at the end of the specification.

In the drawings:

Figure 1 is a plan view of an apparatus embodying the several features of the invention in a preferred arrangement Figure 2 is a side elevation of the same.
Figure 3 is a sectional view taken on the line 3—3 of Figure 4.
Figure 4 is a sectional view taken on the line 4—4 of Figure 3.
Figure 5 is an enlarged side elevation partly in section, of a portion of the gearing.
Figure 6 is a sectional view on line 6—6 of Figure 1.
Figure 7 is a plan view of the bed of the machine with the cutter mechanism and blank carrier removed.
Figure 8 is a diagrammatic view showing the general arrangement of gearing controlling the several parts of the machine.
Figure 9 is a diagram illustrating the relation of the returning, indexing, and feeding motions to the rolling-generating motion in the old type of machines.
Figure 10 is a diagram illustrating the relation of the returning, indexing, and feeding motions to the rolling-generating motion in the present apparatus, and
Figure 11 is a diagram of the cam which controls the returning and feeding motions.

The structure herein disclosed comprises generally a cutter mechanism embodying a rotary tool support or spindle mounted upon a carrier or cradle which is adapted to oscillate, moving in one direction while cutting and in the opposite direction to permit indexing. The gear blank is mounted on a support or spindle which is rotated about its axis in one direction during the cutting operation and in the reverse direction while out of cutting contact, and the gear blank support is arranged upon a table which is moved back and forth in a horizontal plane, preferably being oscillated, in order to feed the gear blank into cutting contact with the tool and to return it from cutting contact to permit indexing.

The motions of the cutter mechanism carrier or cradle and of the gear blank support are slower during the cutting operation and faster during the return and feeding movements, and these different motions are governed from a continuously operating driving shaft which controls a reversing or driven shaft through suitable automatic reversing mechanism. The arrangement of gears between the driving shaft and the driven shaft or reversing shaft is such that the reversing shaft travels at a relatively slow speed in one direction and at a relatively fast speed in the opposite direction, the motion of the reversing shaft being suitably transmitted to the cutter mechanism cradle and to the gear blank support.

The returning and feeding motions of the gear blank support are effected by an actuating device preferably consisting of a continually operating rotary cam of such form as to cause the gear blank to feed toward the cutter partly during the last part of the rolling-indexing motion and partly during the first part of the rolling-generating motion, also to return the gear blank partly during the last part of the rolling-generating motion and during the first part of the rolling-indexing motion. The cam which controls the returning and feeding motions of the gear blank support is rotated continually in one direction preferably at varying speeds, and is operated from the reversing shaft previously mentioned through a mechanism which serves to convert the opposite motions of the reversing shaft into a continuous motion in one direction.

The means for adjusting the tool radially of the cutter mechanism carrier or cradle consists generally in mounting the tool supporting spindle eccentrically of an adjusting frame, and mounting said adjusting frame eccentrically of the cutter mechanism carrier. Then by turning the adjusting frame to any desired point with reference to the carrier, the tool supporting spindle is moved in a circular path which causes it to have an adjustment toward and from the centre of the cutter mechanism carrier. With these brief observations, the details of the apparatus will now be described, it being understood that the disclosure is intended only as an illustration of one means of carrying out the invention, and does not limit the scope of the novel features to the precise details or arrangements that will be described.

Referring to Figures 1 and 2, 1 designates the bed of the machine having arranged thereon an upstanding portion 2 which supports the cutter mechanism, and a platform 3, upon which is arranged the table 4 on which the gear blank support is arranged. The table 4 is arranged to oscillate in a horizontal plane about the vertical axis 5, see Figure 1, in order to move the gear blank 6 toward and from the circular cutter 7 to permit cutting and indexing the blank. For convenience the invention is disclosed in connection with a circular rotary cutter adapted to produce curved teeth, or what are some times known as "spiral" teeth, but the invention is equally applicable to machines for producing straight teeth. Furthermore, while in the mechanism illustrated, the gear blank and its support are moved toward and from the cutter to permit indexing, this specific motion is not essential to the invention, as long as there is a relative motion between the cutter and gear blank which alternately brings them into cutting contact and separates them, it being a well known expedient in this art to move either a cutter toward and from a blank, or a blank toward and from a cutter for indexing purposes.

The gear blank 6 is mounted upon a support or spindle 8 which carries a worm wheel 9 which is operated from a reversing shaft 10, through a shaft 11, see Figure 8, while cutting, feeding, and returning, and also through shafts 12 and 13 while indexing. The means for supporting, driving, and indexing the gear blank, including the parts just previously referred to, are substantially the same as disclosed in application Serial No. 333,014, filed October 24, 1919, and since these parts are not novel in themselves, and form no part of the present invention except in connection with the other mechanism to be described, it is unnecessary to set them forth in any greater detail. It is sufficient to understand that the gear blank is turned in one direction while being cut and in the opposite direction when withdrawn from the cutter, these opposite motions being transmitted from the shaft 10 which rotates alternately in opposite directions. The shaft 10, or driven shaft, is operated from a driving shaft 14 which rotates continuously in the same direction and is operated from the main power shaft 15 carrying the driving pulley 16. The automatic reversing mechanism which connects driving shaft 14 with the driven shaft 10 is substantially the same as that disclosed in Patent No. 1,203,608, November 7, 1916, the function being to connect one shaft to the other through a pair of rotary sleeves, or equivalent members which are constantly turning in opposite directions and are alternately locked in engagement with the driven shaft at predetermined intervals.

In the prior patent referred to, the driven shaft which is controlled by the reversing mechanism, travels at the same speed in both directions, with the result that the cutter cradle oscillates and the gear blank carrier rotates at the same speed in both directions. One of the accomplishments of the present invention is to increase the speed of the apparatus by increasing the speed of the returning, indexing, and feeding motions, and this is brought about by causing the driven shaft 10 to travel faster in one direction than in the other, its motion during the cutting operation being relatively slow and during the reverse motion relatively fast.

The relatively fast motion of the shaft 10 is imparted from shaft 14 through gears 17 and 18, see Figures 5 and 8, while the relatively slow motion is imparted through gears 19, 20, 21 and 22. The gears 18 and 22 are fixedly connected to the respective sleeves 23 and 24, see Figure 5, which are alternately locked to the driven shaft 10 by a reversing mechanism such as shown in said previously mentioned patent. The train of gears 19, 20, 21 and 22 constitute change gears which can be replaced by other sets of gears. This is for the purpose of varying the speed during the cutting operation, which is slower than during the rest of the cycle, as it is often desirable to modify the cutting speed for different sizes and kinds of gears. The gears 17 and 18, on the contrary, are permanently arranged to give a maximum speed to the driven shaft 10, and in turn impart a maximum speed to the several parts of the apparatus during the returning, indexing and feeding motions, this speed being preferably constant for all gears. In prior machines, where it was necessary to modify the cutting speed, making it slower, it necessarily involved slowing the speed of the machine during the returning, indexing, and feeding motions, thereby greatly reducing the speed of the entire operation, but with the present arrangement, any necessary slowing of the machine affects only the actual cutting operation, and a maximum speed can be maintained for returning, indexing, and feeding, irrespective of the cutting speed.

The gear blank support, and the table 4 on which it is mounted, are oscillated by means of an actuating device, preferably comprising a rotary cam 25, fixed upon a cam shaft 26, which latter is provided with a worm 27 keyed thereon and driven by a worm 28 on the worm shaft 29. It is necessary that the worm shaft 29, or driven member, be operated from the reversing shaft 10, in order that the cam which controls the feeding motion of the gear blank will have the same variable speed as the shaft 10, and it is also necessary that the cam 25 and worm shaft 29 be driven continually in the same direction. In order to accomplish this, the following mechanism is provided.

The shaft 12, which is driven by the shaft 10 has a corresponding reversing motion, and has fixed thereon a gear 30 engaging a gear 31, which is loosely arranged on the driven member 29, see Figures 5 and 8. Also loosely arranged on the driven member 29 is a bevel gear 32, while 33 is a second bevel gear keyed to driven member 29. 34 designates an idler gear journaled on an arbor 35 and having engagement with the gears 32 and 33. The gears 32 and 33 are arranged on suitable sleeves having inclined clutch surfaces 36 and 37 on their adjacent faces and 38 is a slidable device, preferably consisting of a pin carried by the gear 31 and cooperating alternately with the clutch faces 36 and 37. As the driving shaft 12 travels first in one direction and then in the other, the gear 31 has a corresponding reversing motion and as the pin 38 is arranged to lock with one or the other of the clutch faces 36 and 37, the latter are alternately driven by the gear 31. As the gear 31 reverses, the pin 38 is forced to its opposite position by the inclination of the clutch face with which it is then cooperating. When the bevel gear 32 is being driven by the gear 31, it turns loosely on the driven member 29 and operates the same through idler 34 and gear 33, whereas when bevel gear 33 is driven by the gear 31, it carries the driven member 29 with it, and thus the latter is always rotated in the same direction but at varying speeds corresponding to the speeds of the opposite motions of the reversing shaft 10.

The rotary cutter 7 is mounted in a carrier or cradle 39 which is of circular form and adapted to oscillate on a guide 40, see Figure 4. This oscillatory motion of the cradle 39 rolls the cutter past the gear blank as the latter rotates about its own axis, and thus effects generation of the tooth, and it will be understood that for the purposes of this invention, it is not essential that the rolling movement be imparted to the cutter mechanism, so long as the relative motion of the tool and blank is effected in accordance with the known practice in this art of imparting an equivalent rolling movement either to the gear blank or to the cutter mechanism. The cradle or carrier 39 is provided with a worm wheel 41, see Figures 3 and 8, driven by a worm 42 which is fixed on a shaft carrying a bevel gear 43 operated from bevel gear 44 on a shaft which is driven from shaft 11 through gears 45, 46, 47 and 48. Thus the cutter mechanism carrier or cradle 39 is driven alternately in opposite directions from the shaft 10 through the shaft 11 and the conecting gearing, whereby it travels slowly during the cutting operation, and fast during the period that the gear blank and cutter are out of cutting contact.

Actual cutting of the blank takes place during the uproll of the cradle which supports the cutter mechanism, or the rolling-generating motion, and during the down-roll of the cradle, or the rolling-indexing motion, the blank is returned, indexed, and fed again toward the cutter. This is illustrated by the diagram of Figure 10, where line $x$ represents the up-roll or rolling-generating motion, and line $y$ represents the down-roll or rolling-indexing motion. The straight portion of line $x$ represents the period during which actual cutting takes place, the tool and blank then being in cutting contact, while the curved portions at the ends of the line represent the periods during which the blank commences to move away from the tool (this being the curved part at the top of line $x$), and when the blank completes its feeding motion toward the tool (this being the curved part at the bottom of line $x$). The straight part of the line $y$ represents the period during the rolling-indexing motion when the tool and blank are disengaged and the blank is being indexed. The curved portion at the top of line $y$ represents the completion of the return movement of the gear blank, and the curved portion at the bottom of line $y$ represents the commencing of the feeding movement of the blank back toward the tool.

The distinction between the present construction and former constructions will be found by a comparison of Figure 10 with Figure 9. In the latter diagram, $x'$ represents the period during which the tool and gear blank are in cutting contact, and $y'$ represents the period during which they are out of cutting contact. In the old type, the tool and blank are in cutting contact throughout the entire up-roll or rolling-generating motion, and the blank does not commence to withdraw from the tool until the down-roll or rolling-indexing motion; moreover, the blank completes its feeding motion back to the tool also during the down-roll or rolling-indexing motion. Owing to the fact that in the old type construction, the tool and blank are in cutting contact both at the beginning and the end of the up-roll or rolling-generating motion, it was necessary to disengage the tool and blank by an excessive rolling motion, as otherwise upon reversal of the direction of roll, the back lash in the gear trains would cause the tool to cut into the blank at an improper position. This involved rolling the parts relatively much farther than was actually necessary for cutting, in order to disengage them to permit the reverse rolling motion, resulting in a corresponding increase in the time required for a complete cycle.

With the present arrangement, the gear blank commences to move away from the tool during the up-roll or rolling-generating motion, and the feeding-in motion of the gear blank is completed during the first part of the up-roll. The result is that at the beginning and at the end of the rolling-generating motion, the tool and blank are out of cutting contact, and are only in cutting contact during the generating or cutting action. This reduces considerably the actual amount of rolling required in both directions, and by driving the parts at faster speed during the rolling-indexing motion, the effective speed of the machine and its productive capacity is materially increased. The returning and feeding motions of the gear blank away from and toward the tool are caused by the cam 25, which rotates continuously and cooperates with the table 4 on which the gear blank support is mounted. The cam 25 is so formed, with relation to the timing of the rolling motion of the cutter mechanism carrier, as to cause the gear blank to commence to return, or withdraw from the tool during the last part of the uproll, and to complete the final feeding motion of the gear blank back toward the tool during the first part of the up-roll.

The cutter 7 is mounted on a tool support consisting of a rotary spindle 50, which is suitably journaled in an adjusting frame 51. The spindle 50 is disposed eccentrically of the adjusting frame 51, and the adjusting frame 51 is arranged eccentrically of the carrier 39 in a suitable guideway formed on the carrier, in which the flange 52 of the adjusting frame is rotatable. The cutter head carries an internal gear 53 driven by a pinion 54, which is keyed on the shaft 55, the latter also being mounted on the adjusting frame 51. The shaft 55 has a bevel pinion 56, see Figure 4, engaging a bevel pinion 57 on the vertical spindle 58 which is driven through suitable gearing from the main drive shaft 15, as shown clearly in Figure 8.

The adjusting frame 51 has attached thereto a gear segment 59 engaged by a worm 60 on a spindle 61, see Figure 3. The spindle 61 also carries a bevel gear 62 with which cooperates a bevel gear 63 on a spindle 64, the latter having a squared end 65, see Figure 2, by which it may be turned manually to move the adjusting frame to any desired position. When the adjusting frame is turned within the carrier 39, it causes the tool and tool spindle to have a movement in a curved path, which is eccentric of the axis about which the carrier 39 oscillates, thereby adjusting the tool toward and from the center of the carrier 39. Such an adjustment of the cutter is necessary for different sizes of gear blanks and by the arrangement described the necessary adjustment is effected by a single movement of the cutter in a curved path. While this is preferably accomplished by disposing the adjusting frame eccentrically of the cutter carrier, and the tool spindle eccentrically of the adjusting frame, there are other ways in which the cutter might be given its necessary adjustment by a single movement with reference to the cutter mechanism carrier.

The operation of the machine briefly is as follows: Proper positioning of the tool with reference to the gear blank is made by turning the adjusting frame 51 within the carrier 39 and the gear blank is also adjusted to proper position on its supporting spindle and table. Power is then applied to the apparatus and the gear blank is first fed in toward the cutter. The cutter mechanism carrier 39 then commences to rotate through what is known as the up-roll, or rolling-generating motion, and the rotating tool support 50 is rolled upwardly to carry the tool past the blank while the latter rotates about its own axis. During the first part of the rolling-generating motion, the gear blank is fed toward the tool until they are in proper cutting contact. This is followed by the actual cutting action which occurs during the major part of the up-roll, and until the gear blank starts to withdraw from the tool, or return to its indexing position, during the latter part of the up-roll. The return movement of the gear blank which occurs during the latter part of the rolling-generating motion is only sufficient to withdraw the tool from cutting contact, and it is not entirely disengaged until during the down-roll. The moment that the blank is moved far enough away to be out of cutting contact, the rolling motion reverses, that is to say, the cutter mechanism carrier 39 starts to rotate in the opposite direction for the down-roll and the blank reverses its rotation about its own axis. During this down-roll or rolling-indexing motion of the cutter carrier and blank, the blank support is moved still farther away from the tool to complete the return motion, and the blank is then indexed. After this, the blank support is moved back toward the cutter, to feed the blank again toward cutting position during the latter part of the down-roll or rolling-indexing motion, the feeding motion of the blank toward the cutter being completed during the first part of the up-roll of the next cycle. The speed of the different parts during the down-roll is preferably constant for all kinds of work, and much faster than the speed during the up-roll when cutting takes place, and the speed during the up-roll or rolling-generating motion can be regulated according to the size and characteristics of the work.

While the several features of the invention have been described with reference to a curved tooth generating type of machine, the invention is not to be limited to any particular class of machines, and this application is intended to cover any modifications or other adaptations of the novel features herein set forth insofar as they may be applicable to gear cutting machines for straight teeth, or machines of the non-generating type, where the teeth are roughed out but are not finished.

We claim:—

1. A gear cutting apparatus embodying a gear blank support and a cutter mechanism, one of which is movable toward and from the other to bring a tool and blank into and out of engagement to permit cutting and indexing, means for effecting a relative rolling-generating motion of the tool and blank in one direction to form a tooth and a relative rolling-indexing motion in the opposite direction while indexing, and means acting automatically to move the tool and blank into cutting contact during the first part of said rolling-generating motion.

2. A gear cutting apparatus embodying a gear blank support and a cutter mechanism, one of which is movable toward and from the other to bring a tool and blank into and out of engagement to permit cutting and indexing, means for effecting a relative rolling-generating motion of the tool and blank in one direction to form a tooth and a relative rolling-indexing motion in the opposite direction while indexing, and means acting automatically to move the tool and blank out of cutting contact during the latter part of said rolling-generating motion.

3. A gear cutting apparatus embodying a gear blank support and a cutter mechanism, one of which is movable toward and from the other to bring a tool and blank into and out of engagement to permit cutting and indexing, means for effecting a relative rolling-generating motion of the tool and blank in one direction to form a tooth and a relative rolling-indexing motion in the opposite direction while indexing, and means acting automatically to move the tool and blank into and out of cutting contact during the first and latter parts of said rolling-generating motion, respectively.

4. A gear cutting apparatus embodying a gear blank support and a cutter mechanism, one of which is movable toward and from the other to bring a tool and blank into and out of engagement to permit cutting and indexing, means for effecting a relative rolling-generating motion of the tool and blank in one direction at a relatively slow speed to form a tooth and a relative rolling-indexing motion in the opposite direction at a relatively fast speed while indexing, and means acting automatically to move the tool and blank into cutting contact during the first part of said rolling-generating motion.

5. A gear cutting apparatus embodying a gear blank support and a cutter mechanism, one of which is movable toward and from the other to bring a tool and blank into and out of engagement to permit cutting and indexing, means for effecting a relative rolling-generating motion of the tool and blank in one direction at a relatively slow speed to form a tooth and a relative rolling-indexing motion in the opposite direction at a relatively fast speed while indexing, and means acting automatically to move the tool and blank out of cutting contact during the latter part of said rolling-generating motion.

6. A gear cutting apparatus embodying a gear blank support and a cutter mechanism, one of which is movable toward and from the other to bring a tool and blank into and out of engagement to permit cutting and indexing, means for effecting a relative rolling-generating motion of the tool and blank in one direction at a relatively slow speed to form a tooth and a relative rolling-indexing motion in the opposite direction at a relatively fast speed while indexing, and means acting automatically to move the tool and blank into and out of cutting contact during the first and latter parts of said rolling-generating motion respectively.

7. A gear cutting apparatus embodying a gear blank support and a cutter mechanism, one of which is movable toward and from the other to bring a tool and blank into and out of engagment to permit cutting and indexing, means for effecting a relative rolling-generating motion of the tool and blank in one direction to form a tooth and a relative rolling-indexing motion in the opposite direction to permit returning, indexing, and feeding a blank relatively to a tool, and means acting automatically to commence said relative return motion of the blank during the latter part of said rolling-generating motion.

8. A gear cutting apparatus embodying a gear blank support and a cutter mechanism, one of which is movable toward and from the other to bring a tool and blank into and out of engagement to permit cutting and indexing, means for effecting a relative rolling-generating motion of the tool and blank in one direction to form a tooth and a relative rolling-indexing motion in the opposite direction to permit returning, indexing, and feeding a blank relatively to a tool, and means acting automatically to complete said relative feeding motion of the blank during the first part of said rolling-generating motion.

9. A gear cutting apparatus embodying a gear blank support and a cutter mechanism, one of which is movable toward and from the other to bring a tool and blank into and out of engagement to permit cutting and indexing, means for effecting a relative rolling-generating motion of a tool and blank in one direction to form a tooth and a relative rolling-indexing motion in the opposite direction to permit returning, indexing, and feeding the blank relatively to the tool, and means acting automatically to commence said relative return motion of the blank and to complete said relative feeding motion of the blank during said rolling-generating motion, and at the latter and first parts of said rolling-generating motion respectively.

10. A gear cutting apparatus embodying a gear blank support and a cutter mechanism, one of which is movable toward and from the other to bring a tool and blank into and out of engagement to permit cutting and indexing, means for effecting a relative rolling-generating motion of the tool and blank in one direction to form a tooth and a relative rolling-indexing motion in the opposite direction to permit returning, indexing, and feeding a blank relatively to the tool, and means acting automatically to commence said relative return motion of the blank at a relatively slow speed during the rolling-generating motion and to complete said return motion at a relatively fast speed during the rolling-indexing motion.

11. A gear cutting apparatus embodying a gear blank support and a cutter mechanism, one of which is movable toward and from the other to bring a tool and blank into and out of engagement to permit cutting and indexing, means for effecting a relative rolling-generating motion of the tool and blank in one direction to form a tooth and a relative rolling-indexing motion in the opposite direction to permit returning, indexing, and feeding a blank relatively to the tool and means acting automatically to commence said relative feeding motion during said rolling-indexing motion at relatively fast speed and to complete said feeding motion during said rolling-generating motion and at relatively slow speed.

12. A gear cutting apparatus embodying a gear blank support and a cutter mechanism, one of which is movable toward and from the other to bring a tool and blank into and out of engagement to permit cutting and indexing, means for effecting a relative rolling motion of the tool and blank in one direction to form a tooth and a relative rolling-indexing motion in the opposite direction to permit returning, indexing, and feeding a blank relatively to the tool, and means acting automatically to commence said relative return motion of the blank at a relatively slow speed during the rolling-generating motion, to complete said return motion at a relatively fast speed during the rolling-indexing motion, to commence said relative feeding motion during said rolling indexing motion at relatively fast speed, and to complete said feeding motion during said rolling-generating motion and at relatively slow speed.

13. A gear cutting apparatus embodying a gear blank support and a cutter mechanism, one of which is movable toward and from the other to bring a tool and blank into and out of engagement to permit cutting and indexing, means for effecting a relative rolling-generating motion of the tool and blank in one direction to form a tooth and a relative rolling-indexing motion in the opposite direction while indexing, said last mentioned means including a driving shaft turning continuously in one direction, a driven shaft operatively associated therewith through reversing mechanism whereby the driven shaft travels alternately in opposite directions, and gearing between the driving and driven shafts whereby the driven shaft travels at a constant speed during the rolling-indexing motion and at a variable speed during the rolling-generating motion.

14. A gear cutting apparatus embodying a gear blank support and a cutter mechanism, one of which is movable toward and from the other to bring a tool and blank into and out of engagement to permit cutting and indexing, means for effecting a relative rolling-generating motion of the tool and blank in one direction to form a tooth and a relative rolling-indexing motion in the opposite direction while indexing, said last mentioned means including a driving shaft turning continuously in one direction, a driven shaft operatively associated therewith through reversing mechanism whereby driven shaft travels alternately in opposite directions, and gearing between the driving and driven shafts operating to turn the driven shaft at a variable slow speed during the rolling-generating motion and at a fast constant speed duringt he rolling-indexing motion.

15. A gear cutting apparatus embodying a gear blank support and a cutter mechanism, one of which is movable toward and from the other to bring a tool and blank into and out of engagement to permit cutting and indexing, means for effecting a relative rolling-generating motion of the tool and blank in one direction to form a tooth and a relative rolling-indexing motion in the opposite direction while indexing, said last mentioned means including a driving shaft turning continuously in one direction, a driven shaft operatively associated therewith through reversing mechanism whereby the driven shaft travels alternately in opposite directions, a rotating cam for effecting said relative movement of the blank support and cutter mechanism toward and from each other, a cam shaft rotating continuously in one direction to drive said cam, and means operatively connecting the aforesaid reversing shaft with said cam shaft whereby the reversing shaft imparts a continuous motion in one direction to the cam shaft.

In witness whereof, the parties have hereunto signed their names.

ARTHUR L. STEWART.
EYVIND FINSEN.